United States Patent Office 2,856,310
Patented Oct. 14, 1958

2,856,310

STABLE KETENE DIMER—EMULSIFIER MIXTURES AND THEIR PREPARATION

Cyrus A. Weisgerber, Chadds Ford, Pa., assignor to Hercules Powder Company, Wilmington, Del., a corporation of Delaware No Drawing. Application February 15, 1955
Serial No. 488,431

15 Claims. (Cl. 106—287)

This invention relates to novel compositions containing a ketene dimer and an emulsifier therefor and to a process for making same.

It is possible to make aqueous emulsions of higher alkyl ketene dimers as disclosed in U. S. 2,627,477, issued to W. F. Downey. In making these emulsions, various types of emulsifiers may be used, including both the ionic and nonionic types. The present invention is particularly concerned with the nonionic type emulsifiers for this purpose. In merchandising alkyl ketene dimers for industrial use it is desirable to ship the ketene dimers and the emulsifier as a unit which the customer can easily convert to an emulsion as needed in his plant. Attempts to put this into practice have been unsuccessful heretofore due to the fact that variable results are ofttimes achieved as respects the emulsifiability of the composition and the quality of the emulsion formed. In general, the longer the mixtures of nonionic emulsifier and the ketene dimers are permitted to stand prior to use, the poorer and poorer become the emulsions produced therefrom, until finally emulsifiability is lost entirely.

It has now been found that there is a certain limited class of nonionic type emulsifiers that are unique in that they completely overcome the deficiency referred to above. Thus, these emulsifiers may be mixed with ketene dimers to form dimer—emulsifier mixtures which are stable over extended periods of time. This makes it possible to manufacture and distribute the dimer and emulsifier in the form of a mixture which can easily and quickly be emulsified merely by the addition of water with accompanying agitation.

In general, the emulsifiers herein disclosed may be prepared by first reacting ethylene oxide with a hexitol, such as sorbitol, to form a polyoxyethylene ether of the hexitol. The polyoxyethylene ether of the hexitol may then be reacted with a 12 to 20 carbon atom fatty acid to form an ester which is then treated to reduce the hydroxyl number as required. The emulsifier may then be mixed with the ketene dimer to form the stable dimer—emulsifier mixture hereinabove referred to.

Having described the invention generally, the following examples are given to illustrate specific embodiments thereof. In the examples, parts are by weight unless otherwise specified.

EXAMPLE 1

This example illustrates the preparation of an acetylated polyoxyethylene sorbitol oleate and its effectiveness in forming a stable mixture with an alkyl ketene dimer. In the preparation 0.625 mole of oleic acid was employed for each hydroxyl equivalent of the polyoxyethylene ether. Fourteen hundred ten parts of oleic acid and 2382 parts of the mixed polyoxyethylene ether, prepared by reacting 182 parts of an aqueous solution of sorbitol containing 85% sorbitol with 2200 parts of ethylene oxide, were charged into an agitated reaction vessel, together with a catalyst consisting of 6.64 parts sodium hydroxide. The charge was reacted in an atmosphere of carbon dioxide at a temperature of 245° C. to an acid number less than 5. This required from 3 to 4 hours. The resulting product, which had a saponification number of about 75 and a hydroxyl number of about 60, was cooled to 90° C. and phosphoric acid added in an amount equivalent to the amount of catalyst employed.

A portion of the product, prepared as described, was withdrawn for use in Example 2. The remainder was heated to 120° C. and about a 10% excess of acetic anhydride added in increments over a period of about ¾ of an hour. The temperature of the charge increased to 140° C. and was held at this temperature for ½ hour after the addition of the acetic anhydride was complete.

This charge was then subjected to a vacuum of 10 mm. at 140° C. until the free acetic acid had been removed. This was checked by determining the acid number of the charge. The charge was then cooled to about 95° C. and filtered. The acetylated product had an acid number of 0.66, a saponification number of 126 and a hydroxyl number of 4.

Two parts of the acetylated emulsifier, prepared as above described, was added to 10 parts of mixed hexadecyl-hexadecenyl-ketene dimers prepared from a mixture of 45% stearic acid and 55% palmitic acid by forming the acid chlorides thereof and then reacting the acid chlorides with a tertiary amine. The mixture was poured into 500 ml. of water at 63–65° C. An excellent emulsion resulted. The stability of the dimer—emulsifier mixture was shown by mixing 100 parts of the dimer and 20 parts of the acetylated emulsifier and storing in a 45° C. oven for 13 days. At the end of this time an excellent emulsion was prepared by pouring a sample of the above mixture into hot water.

EXAMPLE 2

This example illustrates the comparative instability of a mixture of unacetylated polyoxyethylene sorbitol oleate of Example 1 with alkyl ketene dimers. Ten parts of the unacetylated product of Example 1, having a hydroxyl number of 60, was mixed with 100 parts of mixed hexadecyl-hexadecenyl-ketene dimers prepared as described in Example 1. A number of 10-part samples were removed and some were emulsified in 500 parts of water at 63–65° C. The emulsions produced were of good quality. The remaining samples were permitted to stand 7 days at room temperature. The quality of the emulsions produced became poorer and at the end of 7 days were of very poor quality as indicated by extensive creaming (separation of two layers).

EXAMPLE 3

This example illustrates the preparation of an acetylated polyoxyethylene sorbitol oleate utilizing 0.75 mole of oleic acid for each hydroxyl equivalent of the polyoxyethylene ether and its effectiveness in forming a stable mixture with an alkyl ketene dimer. Two hundred forty-nine parts of oleic acid and 351 parts of the mixed polyoxyethylene ether, prepared by reacting 182 parts of an aqueous solution of sorbitol (85% sorbitol) with 2200 parts of ethylene oxide, were charged into an agitated reaction vessel, together with 1.05 parts of a catalyst consisting of sodium hydroxide.

The charge was reacted in an atmosphere of carbon dioxide at a temperature of 245° C. to an acid number less than 6. The resulting product, which had a saponification number of about 85 and a hydroxyl number of about 48, was cooled to about 90° C. and 0.482 cc. of phosphoric acid (85%) added to neutralize the alkali. The charge was then acetylated following the procedure of Example 1. The acetylated product had an acid number of 3.04, a saponification number of 128, and a hydroxyl number of 2. Mixtures of the acetylated product with alkyl ketene dimer in a ratio of 1:5 formed good emulsions even after storage in a 45° C. oven for 13 days. By comparison, emulsions produced from mixtures of ketene dimer with the unacetylated emulsifier rapidly depreciated in quality even when stored at room temperatures and after standing for 7 days were of poor quality as evidenced by extensive creaming.

EXAMPLE 4

This example illustrates the preparation of an acetylated polyoxyethylene sorbitol oleate utilizing 0.5 mole of oleic acid for each hydroxyl equivalent of the polyoxyethylene ether and its effectiveness in forming a stable mixture with an alkyl ketene dimer. Seven hundred twenty-two parts of oleic acid, 1528 parts of the mixed polyoxyethylene ether, prepared by reacting 182 parts of an aqueous sorbitol solution (85% sorbitol) with 2200 parts of ethylene oxide, and 3.93 parts of a catalyst consisting of sodium hydroxide (D. B.) were reacted together in an atmosphere of carbon dioxide and at a temperature of 240° C. to an acid number less than 3. The resulting product, which had an acid number of about 1.0, a saponification number of 64 and a hydroxyl number of 84, was acetylated following the procedure of Example 1. The acetylated product had an acid number of 1.4, a saponification number of 137 and a hydroxyl number of 4. Mixtures of the acetylated material with ketene dimers of the type set forth in Example 1 in a ratio of 1:5 were stable over extended periods of time as evidenced by the formation of good emulsions from such mixtures after storage in a 45° C. oven for 13 days. On the other hand, emulsions produced from mixtures of ketene dimer with the unacetylated emulsifier rapidly depreciated in quality even when stored at room temperatures and at the end of 7 days were of poor quality.

EXAMPLE 5

This example illustrates the preparation of an acetylated polyoxyethylene sorbitol stearate and its effectiveness in forming a stable mixture with an alkyl ketene dimer. In the preparation 0.625 mole of stearic acid was employed for each hydroxyl equivalent of the polyoxyethylene ether. The procedure of Example 1 was followed in reacting together 883 parts D. P. stearic acid, 1367 parts of the mixed polyoxyethylene ether, prepared by reacting 182 parts of an aqueous solution of sorbitol (85% sorbitol) with 2200 parts of ethylene oxide, and 3.93 parts sodium hydroxide (as catalyst). The resulting product had an acid number of 2.4, a saponification number of 84, and a hydroxyl number of 55. The material was acetylated utilizing the procedure of Example 1. The acetylated product had an acid number of 1.6, a saponification number of 130, and a hydroxyl number of 2. Mixtures of the acetylated material with the ketene dimers described in Example 1 in a ratio of about 1:5 were stable over relatively long periods of time as evidenced by their ability to form good emulsions after storage in a 45° C. oven for 13 days. By comparison, emulsions produced from mixtures of the unacetylated material with ketene dimers rapidly depreciated in quality even when stored at room temperatures and after standing for 7 days were of poor quality.

EXAMPLE 6

This example illustrates the preparation of an acetylated polyoxyethylene sorbitol ester from a mixture of fatty acids and its effectiveness in forming a stable mixture with an alkyl ketene dimer. The procedure of Example 5 was repeated employing in place of the 883 parts D. P. stearic acid, 503 parts of a hydrogenated tallow fatty acid containing about 70% stearic acid and about 30% palmitic acid and sold under the trade name "Hystrene T-70," 345 parts of a commercial grade palmitic acid containing 90% palmitic acid, 6% stearic acid, and 4% oleic acid and sold under the trade name "Neo Fat 16" by Armour & Company, and 35 parts of a high grade distilled oleic acid sold under the trade name "Emery 233LL." The dimer—emulsifier mixtures were stable over an extended period of time as evidenced by their ability to form good emulsions after storage in a 45° C. oven for 13 days. By comparison, emulsions produced from mixtures of the unacetylated material with ketene dimers rapidly depreciated in quality even when stored at room temperatures so that at the end of 7 days they were of poor quality.

EXAMPLE 7

This example illustrates the preparation of an acetylated polyoxyethylene sorbitol ester from refined tall oil fatty acids and its effectiveness in forming a stable mixture with an alkyl ketene dimer. In the preparation, 0.5 acid equivalent of the refined tall oil fatty acids was employed for each hydroxyl equivalent of the polyoxyethylene ether. Thirteen hundred twelve parts of refined tall oil containing 47–51% fatty acids, 42–46% resin acids, a maximum of 7.8% unsaponifiables, and 0.1% moisture and sold under the trade name "Unitol S" by Union Bag and Paper Company, 1942 parts of the mixed polyoxyethylene ether, prepared by reacting 182 parts of an aqueous solution of sorbitol (85% sorbitol) with 1760 parts of ethylene oxide, and 5.7 parts sodium hydroxide (as catalyst) were reacted at 265–275° C. in an atmosphere of carbon dioxide to an acid number less than 20. The product was cooled to 90° C. and 2.56 cc. of phosphoric acid added. The resulting material had an acid number of 18, a saponification number of 56 and a hydroxyl number of 98. After acetylation (utilizing the procedure of Example 1) the material had an acid number of 14, a saponification number of 132 and a hydroxyl number of 5. Satisfactory emulsions were obtained from mixtures of the acetylated material with ketene dimers of the type set forth in Example 1 after storage in a 45° C. oven for 13 days. On the other hand, emulsions produced from mixtures of the unacetylated material with ketene dimers rapidly depreciated in quality and at the end of 7 days were of very poor quality.

EXAMPLE 8

This example illustrates the preparation of an acetylated polyoxyethylene sorbitol ester from refined tall oil fatty acids and its effectiveness in forming a stable mixture with an alkyl ketene dimer. In the preparation, 0.75 acid equivalent of the tall oil fatty acids was employed for each hydroxyl equivalent of the polyoxyethylene ether. Two hundred seventy-six parts Unitol S, 324 parts of the mixed polyoxyethylene ether, prepared by reacting 182 parts of an aqueous solution of sorbitol (85% sorbitol) with 2200 parts ethylene oxide, and 0.97 parts sodium hydroxide (D. B.) were reacted at 255° C. in an atmosphere of carbon dioxide to an acid number of 26–28. The product was cooled to 90° C. and 0.437 cc. of phosphoric acid (85%) added. The resulting material had an acid number of about 27.5, a saponification number of about 65, and a hydroxyl number of about 72. After acetylation (utilizing the procedure of Example 1) the material had an acid number of 23.8, a saponification number of 118 and a hydroxyl number of 4. Satisfactory emulsions were obtained from mixtures of the acetylated material with ketene dimers of the type set forth in Example 1 after storage in a 45° C. oven for 13 days. By comparison, emulsions produced from mixtures of the unacetylated material with ketene dimers rapidly depreciated in quality and after standing for 7 days were of poor quality.

EXAMPLE 9

A mixture of 98 parts of alkyl ketene dimer prepared from Hystrene T-45 (mixture of fatty acids containing 45% stearic acid and 55% palmitic acid) and 2 parts of Hystrene T-45 was mixed in one case with 20 parts of the acetylated emulsifier of Example 1 and in a second case with 20 parts of the unacylated emulsifier of Example 1. These samples were mixed while molten and permitted to solidify. Each was permitted to stand at room temperature over a period of 12 months. Initial and final dimer concentration (determined by the piperidine method) and the quality of a 20% emulsion prepared from each are shown in Table 1 below. In the table the sample containing the acetylated emulsifier is designated by the letter A and the sample containing the unacetylated emulsifier is designated by the letter U.

Table 1

| Sample | Time Elapsed, mo. | Dimer Content | Quality of Emulsion |
|---|---|---|---|
| A | 0 | 74.1 | Satisfactory. |
| U | 0 | 76.3 | Showed some creaming. |
| A | 12 | 64.5 | Poorer than initially but usable. |
| U | 12 | 60.4 | Not usable. |

As shown in the table, the drop in dimer content is greater for the sample (U) containing the unacetylated emulsifier than for the sample (A) containing the acetylated emulsifier. However, the difference between emulsifiers is shown more by the difference in emulsion quality than by change in dimer content.

The ketene dimers which are useful in the compositions of the present invention are those having the formula $[RCH=C=O]_2$ where R is a hydrocarbon radical, such as alkyl having at least 8 carbon atoms, cycloalkyl having at least 6 carbon atoms, aryl, aralkyl, and alkaryl. In naming ketene dimers, the radical "R" is named followed by "ketene dimer." Thus, phenyl ketene dimer is:

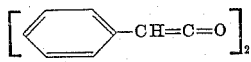

benzyl ketene dimer is:

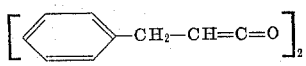

and decyl ketene dimer is: $[C_{10}H_{21}-CH=C=O]_2$. Representative ketene dimers whose emulsions may be used in the process of the instant invention include octyl, decyl, dodecyl, tetradecyl, hexadecyl, octadecyl, eicosyl, docosyl, tetracosyl, phenyl, benzyl, β-naphthyl and cyclohexyl ketene dimers, as well as the ketene dimers prepared from montanic acid, naphthenic acid, $\Delta^{9,10}$-decylenic acid, $\Delta^{9,10}$-dodecylenic acid, palmitoleic acid, oleic acid, ricinoleic acid, petroselinic acid, vaccenic acid, linoleic acid, linolenic acid, eleostearic acid, licanic aid, parinaric acid, tariric acid, gadoleic acid, arachidonic acid, cetoleic acid, erucic acid and selacholeic acid, as well as ketene dimers prepared from naturally occurring mixtures of fatty acids, such as those mixtures found in coconut oil, babassu oil, palm gernel oil, palm oil, olive oil, peanut oil, rape oil, beef tallow, lard (leaf) and whale blubber. Mixtures of any of the above-named fatty acids with each other may also be used. Thus, a mixture of stearic and oleic acids gives a ketene dimer which is very easily emulsified. A mixture which is particularly preferred is the ketene dimer prepared from a mixture of stearic acid and palmitic acid, particularly a mixture of these two acids containing about 45% stearic acid and 55% palmitic acid.

The emulsifiers herein disclosed are reaction products of a 12 to 20 carbon atom fatty acid and polyoxyethylene ethers of polyhydric alcohols, which reaction products have been treated in a manner such as to reduce their hydroxyl numbers to less than about 10 and preferably to less than about 5. The polyhydric alcohols which have been found most suitable for the purpose are the hexitols, such as dulcitol, mannitol, sorbitol and so on, and, of this group sorbitol is the preferred polyhydric alcohol.

It is not necessary to use a polyoxyethylene ether of a single polyhydric alcohol for the reaction. For example, a mixed polyoxyethylene ether of two or more polyhydric alcohols may be employed.

The polyoxyethylene ethers of polyhydric alcohols which are employed in the present invention are best prepared by reacting polyhydric alcohols with ethylene oxide in a mole ratio of from about 30 to about 75 moles of ethylene oxide per mole of polyhydric alcohol. The polyhydric alcohols may be employed in a substantially anhydrous state or alternately in aqueous solutions containing up to 20% water. The preparation of these ethers is well known and need not be further described herein.

The reaction of the polyoxyethylene ether of a polyhydric alcohol with the 12 to 20 carbon atom fatty acid may be carried out by heating the ingredients with a small proportion of a suitable catalyst, preferably in an atmosphere of carbon dioxide. Suitable catalysts for the purpose are the alkoxides, oxides and hydroxides of metals such as lithium, potassium, sodium, calcium, zinc and lead. From about 0.1% to about 0.2% of catalyst, for example, sodium hydroxide, is generally satisfactory for the reaction. Reaction temperatures employed may vary from about 240° C. to about 310° C.

In carrying out the reaction, the fatty acid is reacted with the polyoxyethylene ether in a ratio of from about 0.5 to about 0.85 mole of fatty acid per hydroxyl equivalent of the ether.

The reaction of the polyoxyethylene ether and the fatty acid are continued until the desired emulsifying properties in the product, as determined, for example, by acid number control, are obtained. This will usually take from about 2 to about 8 hours. The product is then cooled to about 90° C. and an acid, for example, phosphoric acid, added to neutralize the alkali.

If color is an important consideration, the reaction can be carried out in the presence of activated carbon such as "Darco." The activated carbon may be filtered out at the completion of the above reaction or alternatively may be carried through the subsequent treatment for reducing the hydroxyl number.

The reduction of the hydroxyl number may be accomplished by any suitable mechanism which will mask or otherwise cover up the reactive hydroxyl groups without changing, or substantially changing, the emulsifying properties of the material. The preferred mechanism for accomplishing this is acylation with, for example, the anhydrides or acid chlorides of lower fatty acids such as acetic acid and propionic acid. Ketenes, such as ketene, methyl ketene and so on, may also be used. Alternatively, the material may be esterified by reacting with isocyanate to form carbamate ester.

Alkylation is also effective in accomplishing the desired reduction of the hydroxyl number. Thus, for example, the hydroxyl containing material may be subjected to an etherification reaction utilizing (1) dimethyl sulfate in the presence of an alkali or (2) an alkyl iodide in the presence of a sodium derivative of the hydroxyl containing material. Alternatively, the hydroxy component of the material may be condensed with an olefin, such as isobutylene, in the presence of an acid catalyst, such as sulfuric acid, to form isobutyl ether. Cyanoethylation may also be used by reacting the hydroxy component of the material with acrylonitrile in the presence of a tertiary amine.

While it is apparent from the above that various types of reactions may be utilized to cover or mask the hydroxyls of the material, the most preferred procedure is acetylation with acetic anhydride wherein an excess of acetic anhydride, usually about 10% excess, is employed. The hydroxyl number of the emulsifier to be acetylated is utilized in calculating the amount of acetic anhydride required.

If it is desired to improve the color of the product, it is bleached with a bleaching agent such as, for example, "Albone," at 100° C. The product is subjected to vacuum after bleaching to reduce the water content below 0.5%. The amount of Albone used is usually 0.5 to 1% based on the charge.

The relative proportions of the ketene dimer and emulsifying agent may be varied as desired, depending principally on the ultimate use contemplated for the composition. In general, however, the emulsifier will comprise from about 5% to about 30% or more by weight of the composition and preferably from about 13% to about 17%. Actually, the upper limit is set because of economic reasons, and not because of inoperability, when larger amounts of emulsifier are used.

The compositions of the invention are easily and quickly emulsified by the addition of warm water. For use in the treatment of cellulosic materials such as, for example, paper and the like, the composition will generally be employed in dilute form usually containing between about 0.01 and about 2.0% and preferably between about 0.1 and about 0.6% of the ketene dimer.

It will be understood that numerous modifications of the detailed procedures and materials herein disclosed may be made without departing from the spirit and scope of the invention as defined in the following claims.

What I claim and desire to protect by Letters Patent is:

1. A composition comprising a ketene dimer and an emulsifier therefor, said ketene dimer having the formula [RCH=C=O]$_2$ where R is a hydrocarbon radical selected from the group consisting of alkyl groups having at least 8 carbon atoms, cycloalkyl having at least 6 carbon atoms, aryl, aralkyl, and alkaryl groups, said emulsifier comprising a reaction product selected from the group consisting of acylation, etherification and alkylation reaction products of a 12 to 20 carbon atom fatty acid with a polyoxyethylene ether of a hexitol containing from 30 to 75 oxyethylene groups per mole, the ratio of fatty acid to polyoxyethylene ether of hexitol being from about 0.5 to about 0.85 mole of fatty acid per hydroxyl equivalent of the ether, the hydroxyl number of said emulsifier being less than 10.

2. A composition comprising a ketene dimer and an emulsifier therefor, said ketene dimer having the formula [RCH=C=O]$_2$ where R is a hydrocarbon radical selected from the group consisting of alkyl groups having at least 8 carbon atoms, cycloalkyl having at least 6 carbon atoms, aryl, aralkyl, and alkaryl groups, said emulsifier comprising the acylation product of an ester of a 12 to 20 carbon atom fatty acid with a polyoxyethylene ether of a hexitol containing from 30 to 75 oxyethylene groups per mole, the ratio of fatty acid to polyoxyethylene ether being from 0.5 to about 0.85 mole of fatty acid per hydroxyl equivalent of the ether, the hydroxyl number of said emulsifier being less than 10.

3. A composition comprising a ketene dimer and an emulsifier therefor, said ketene dimer having the formula [RCH=C=O]$_2$ where R is a hydrocarbon radical selected from the group consisting of alkyl groups having at least 8 carbon atoms, cycloalkyl having at least 6 carbon atoms, aryl, aralkyl, and alkaryl groups, said emulsifier comprising the alkylation product of an ester of a 12 to 20 carbon atom fatty acid with a polyoxyethylene ether of a hexitol containing from 30 to 75 oxyethylene groups per mole, the ratio of fatty acid to polyoxyethylene ether being from 0.5 to about 0.85 mole of fatty acid per hydroxyl equivalent of the ether, the hydroxyl number of said emulsifier being less than 10.

4. A composition comprising a ketene dimer and an emulsifier therefor, said ketene dimer having the formula [RCH=C=O]$_2$ where R is a hydrocarbon radical selected from the group consisting of alkyl groups having at least 8 carbon atoms, cycloalkyl having at least 6 carbon atoms, aryl, aralkyl, and alkaryl groups, said emulsifier comprising the etherification product of an ester of a 12 to 20 carbon atom fatty acid with a polyoxyethylene ether of a hexitol containing from 30 to 75 oxyethylene groups per mole, the ratio of fatty acid to polyoxyethylene ether being from 0.5 to about 0.85 mole of fatty acid per hydroxyl equivalent of the ether, the hydroxyl number of said emulsifier being less than 10.

5. A composition comprising a ketene dimer and an emulsifier therefor, said ketene dimer having the formula [RCH=C=O]$_2$ where R is a hydrocarbon radical selected from the group consisting of alkyl groups having at least 8 carbon atoms, cycloalkyl having at least 6 carbon atoms, aryl, aralkyl, and alkaryl groups, said emulsifier comprising the acetylation product of an ester of a 12 to 20 carbon atom fatty acid with a polyoxyethylene ether of a hexitol containing from 30 to 75 oxyethylene groups per mole, the ratio of fatty acid to polyoxyethylene ether being from 0.5 to about 0.85 mole of fatty acid per hydroxyl equivalent of the ether, the hydroxyl number of said emulsifier being less than 10.

6. A composition comprising a ketene dimer and an emulsifier therefor, said ketene dimer having the formula [RCH=C=O]$_2$ where R is a hydrocarbon radical selected from the group consisting of alkyl groups having at least 8 carbon atoms, cycloalkyl having at least 6 carbon atoms, aryl, aralkyl, and alkaryl groups, said emulsifier comprising the acetylation product of the mixed ester obtained by reacting a 12 to 20 carbon atom fatty acid with a polyoxyethylene ether obtained by condensing ethylene oxide with a hexitol in a ratio of from about 1320 parts by weight to about 3300 parts by weight of ethylene oxide to 182 parts by weight of the hexitol, the ratio of fatty acid reacted with polyoxyethylene ether being from about 0.5 to about 0.85 mole of fatty acid per hydroxyl equivalent of the ether, the hydroxyl number of said emulsifier being less than 10.

7. A composition comprising a ketene dimer and an emulsifier therefor, said ketene dimer having the formula [RCH=C=O]$_2$ where R is a hydrocarbon radical selected from the group consisting of alkyl groups having at least 8 carbon atoms, cycloalkyl having at least 6 carbon atoms, aryl, aralkyl, and alkaryl groups, said emulsifier comprising the acetylation product of the mixed ester obtained by reacting a 12 to 20 carbon atom fatty acid with a polyoxyethylene ether obtained by condensing ethylene oxide with sorbitol, the ratio of ethylene oxide to sorbitol being from about 1320 to about 3300 parts by weight ethylene oxide per 182 parts by weight sorbitol, and the ratio of fatty acid reacted with polyoxyethylene ether being from about 0.5 to about 0.85 mole of fatty acid per hydroxyl equivalent of the ether, the hydroxyl number of said emulsifier being less than 10.

8. The acetylation product of claim 7 wherein the 12 to 20 carbon atom fatty acid is oleic acid.

9. The acetylation product of claim 7 wherein the 12 to 20 carbon atom fatty acid is stearic acid.

10. The acetylation product of claim 7 wherein the 12 to 20 carbon atom fatty acid comprises a mixture of fatty acids.

11. The acetylation product of claim 7 wherein the 12 to 20 carbon atom fatty acid comprises a mixture of fatty acids derived from tall oil.

12. A composition comprising a ketene dimer having the formula [RCH=C=O]$_2$ where R is a hydrocarbon radical selected from the group consisting of alkyl groups having at least 8 carbon atoms, cycloalkyl having at least 6 carbon atoms, aryl, aralkyl and alkaryl groups and an emulsifier therefor comprising an acetylated ester of a polyoxyethylene hexitol and a 12 to 20 carbon atom fatty acid, said emulsifier having a hydroxyl number less than 10.

13. A composition comprising a ketene dimer having the formula [RCH=C=O]$_2$ where R is a hydrocarbon radical selected from the group consisting of alkyl groups having at least 8 carbon atoms, cycloalkyl having at least 6 carbon atoms, aryl, aralkyl and alkaryl groups and an emulsifier therefor comprising an acetylated polyoxyethylene hexitol oleate having a hydroxyl number less than 10.

14. A composition comprising a ketene dimer having the formula $[RCH=C=O]_2$ where R is a hydrocarbon radical selected from the group consisting of alkyl groups having at least 8 carbon atoms, cycloalkyl having at least 6 carbon atoms, aryl, aralkyl and alkaryl groups and an emulsifier therefor comprising an acetylated polyoxyethylene sorbitol oleate having a hydroxyl number less than 10.

15. A composition comprising a ketene dimer having the formula $[RCH=C=O]_2$ where R is a hydrocarbon radical selected from the group consisting of alkyl groups having at least 8 carbn atoms, cycloalkyl having at least 6 carbon atoms, aryl aralkyl and alkaryl groups and an emulsifier therefor comprising an acetylated polyoxyethylene sorbitol oleate, the hydroxyl number of said emulsifier being less than 5.

References Cited in the file of this patent

UNITED STATES PATENTS

| | | |
|---|---|---|
| 2,069,336 | Schmidt et al. | Feb. 2, 1937 |
| 2,441,555 | Barth | May 18, 1948 |
| 2,450,079 | Brown | Sept. 28, 1948 |
| 2,458,520 | Kosak et al. | Jan. 11, 1949 |
| 2,481,278 | Ballard | Sept. 6, 1949 |
| 2,627,477 | Downey | Feb. 3, 1953 |

FOREIGN PATENTS

| | | |
|---|---|---|
| 599,280 | Great Britain | Mar. 9, 1948 |

OTHER REFERENCES

Page 2 of the publication by Atlas Powder Company entitled "Spans and Tweens." Revised December 1943.